United States Patent

Suzuki

Patent Number: 5,118,565

Date of Patent: Jun. 2, 1992

[54] MAGNETIC RECORDING MEDIUM HAVING A MAGNETIC LAYER CONTAINING A FATTY ACID, A FATTY ACID ESTER AND A SINGLE SPECIFIED CARBON BLACK

[75] Inventor: Atsushi Suzuki, Tochigi, Japan

[73] Assignee: Kao Corporation, Tokyo, Japan

[21] Appl. No.: 450,475

[22] Filed: Dec. 14, 1989

[30] Foreign Application Priority Data

Jan. 18, 1989 [JP] Japan ................................. 1-8853

[51] Int. Cl.$^5$ ................................................ G11B 5/00
[52] U.S. Cl. ........................................ 428/336; 428/402; 428/694; 428/695; 428/900; 252/62.54
[58] Field of Search ............... 428/900, 694, 695, 336, 428/402; 252/62.54

[56] References Cited

U.S. PATENT DOCUMENTS

| | | | |
|---|---|---|---|
| 4,501,795 | 2/1985 | Takeuchi et al. | 428/329 |
| 4,539,257 | 9/1985 | Ryoke et al. | 428/323 |
| 4,546,038 | 10/1985 | Yamaguchi et al. | 428/323 |
| 4,803,133 | 2/1989 | Hirota et al. | 428/695 |
| 4,818,606 | 4/1989 | Koyama et al. | 428/323 |

FOREIGN PATENT DOCUMENTS

61-7879 3/1986 Japan .

OTHER PUBLICATIONS

Kokai-No. 62-287 420 to TDK Corp., Patent Abstracts of Japan, vol. 12, No. 178, May 26, 1988.
Kokai-No. 60-280 026 to Fuji Shashin Film K.K., Patent Abstracts of Japan, vol. 9, No. 151, Jun. 26, 1985.
Kokai-No. 61-20 221 to Konishiroku Shashin Kogoy K.K., Patent Abstracts of Japan, vol. 10, No. 169, Jun. 14, 1986.

Primary Examiner—Merrell C. Cashion, Jr.
Assistant Examiner—Steven A. Resan
Attorney, Agent, or Firm—Birch, Stewart, Kolasch & Birch

[57] ABSTRACT

A magnetic recording medium comprises a non-magnetic substrate and a magnetic recording layer provided on said substrate, comprising (a) 100 parts by weight of magnetic powder, (b) 5 to 15 parts by weight of a mixture of a fatty acid ester and a fatty acid in their weigh ratio of 60/40 to 95/5 and (c) 5 to 15 parts by weight of carbon black having an average diameter of a single particle in the range of 0.1 to 2.0 microns. The magnetic power has been preferably treated on the surface with (1) a phosphate or an alkenyl or alkyl succinic acid and (2) an organosilane compound having a hydrolyzable alkoxysilane group in a molecule.

6 Claims, No Drawings

MAGNETIC RECORDING MEDIUM HAVING A MAGNETIC LAYER CONTAINING A FATTY ACID, A FATTY ACID ESTER AND A SINGLE SPECIFIED CARBON BLACK

FIELD OF INDUSTRIAL APPLICATION

The present invention relates to a magnetic recording medium, and more particularly to a magnetic recording medium having good durability.

PRIOR ART

The magnetic recording medium is usually made up of a nonmagnetic support (such as polyester film) and a magnetic coating applied to the support, said magnetic coating being composed of a magnetic powder, binder resin, organic solvent, and other components. Floppy disks among magnetic recording media are required to have a durable magnetic layer because it vigorously rubs on the magnetic head and jacket liner during the recording and reproducing operations and hence the magnetic layer is liable to wear.

A common practice to improve the abrasion resistance of the magnetic layer is to incorporate the magnetic layer with a variety of lubricating agents.

The prior lubricating agent for the purpose includes fatty acids, oleyl oleate, stearic acid butoxide, fatty acid amides, liquid paraffin, and wax. Unfortunately, these lubricating agents are not necessarily satisfactory in their performance. For example, oleyl oleate and stearic acid butoxide are not so effective in improving the durability of the recording media. On the other hand, fatty acids (e.g., stearic acid and oleic acid) and hydrocarbon lubricating agents (e.g., wax) are effective in improving the durability but are poor in miscibility with the binder, and hence they are liable to bleed from the surface of the magnetic layer, fouling the magnetic head, when used in large quantities.

SUMMARY OF THE INVENTION

The present inventors carried out a series of researches on a magnetic recording medium which has improved lubricity and exhibits improved durability under any use environments. As the result, they completed the present invention.

Accordingly, it is an object of the present invention to provide a magnetic recording medium having a non-magnetic base and a magnetic layer, characterized in that said magnetic layer contains:

(a) 100 parts by weight of magnetic powder,
(b) 5-15 parts by weight of a mixture of fatty acid ester and fatty acid, with the mixing ratio being 60/40 to 95/5 (by weight), and
(c) 5-15 parts by weight of carbon black having an average single particle diameter of 0.1 to 2.0 μm.

The magnetic recording medium of the invention comprises a non-magnetic substrate and a magnetic recording layer provided on said substrate, comprising (a) 100 parts by weight of magnetic powder, (b) 5 to 15 parts by weight of a mixture of a fatty acid ester and a fatty acid in their weigh ratio of 60/40 to 95/5 and (c) 5 to 15 parts by weight of carbon black having an average diameter of a single particle in the range of 0.1 to 2.0 microns.

It is preferable that (a) the magnetic power has been treated on the surface with (1) a phosphate having the formula (I), an alkenyl or alkyl succinic acid having the formula (II), a salt thereof or an anhydride thereof and (2) an organosilane compound having a hydrolyzable alkoxysilane group in a molecule; a weight ratio of (1) to (2) ranges from 10:1 to 10:10; and the sum total of (1) and (2) amounts to 0.1 to 15 parts by weight.

The magnetic power is treated with (1) and (2) by introducing the magnetic power, (1) and (2) into an organic solvent being inert to these matters and agitating the resulting dispersion.

The magnetic powder used in the present invention includes needle-like fine metal oxides such as $\gamma$-Fe$_2$O$_3$, Fe$_3$O$_4$, and CrO$_2$; treated $\gamma$-Fe$_2$O$_3$ and iron powder such as Co coated $\gamma$-Fe$_2$O$_3$ and Co-doped $\gamma$-Fe$_2$O$_3$; fine platy barium ferrite magnetic powder; fine platy barium ferrite magnetic powder with a portion of Fe atoms therein replaced one or more than one member of Ti, Co, V, and Nb; and ultrafine particles of metal or alloy such as Co, Fe-Co, and Fe-Ni. Iron powder, which is poor in chemical stability, is usually incorporated with or surface-treated with a small amount of nickel, cobalt, titanium, silicon, or aluminum in the form of metallic atoms, salts, or oxides. In addition, for the purpose of increased stability, iron powder may be coated with a thin oxide film formed in a weak oxidative environment.

According to the present invention, the abovementioned magnetic powder should preferably be surface treated with a phosphate ester represented by the formula below

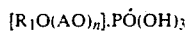

(where R$_1$ is a hydrocarbon group or acyl group having 2-28 carbon atoms, A is an alkylene group having 2-4 carbon atoms, n is an integer of 1-30 and l ia 1, 1.5, or 2.)

or an alkenyl or alkyl succinic acid represented by the formula below or a salt thereof or an anhydride thereof

(where R$_2$ is an alkenyl or alkyl group having 4-20 carbon atoms.)

and an organosilane compound having hydrolyzable alkoxysilane groups in one molecule.

The surface treatment of the magnetic powder may be accomplished by stirring the magnetic powder in an inert organic solvent with the above-mentioned phosphate ester, or an alkenyl or alkyl succinic acid or a salt thereof or an anhydride thereof, and an organosilane compound having hydrolyzable alkoxysilane groups in one molecule, at room temperature or with heating. The two components should preferably be used in a ratio of 10:1 to 10:10 (by weight). The total amount of the two compounds should preferably be 0.1-15 parts by weight, more desirably 0.5 to 10 parts by weight, per 100 parts by weight of the magnetic powder.

The phosphate ester represented by the formula (I) above includes phosphate monoesters, phosphate diesters, and phosphate sesquiester derived from phosphoric acid and a hydroxyl compound having a C$_{2-28}$ hydrocarbon group or a lower alkylene oxide adduct thereof, and phosphate monoester, phosphate diesters and phosphate sesquiesters derived from phosphoric acid and a C$_{2-28}$ fatty acid or a lower alkylene oxide adduct thereof. Examples of the phosphate ester include monododecyl phosphate, monobenzyl phosphate, didodecyl phosphate, sesquidodecyl phosphate, sesquibenzyl phosphate, sesquipropyl phosphate, sesquioctyl phosphate, sesquioleyl phosphate, nonobehenyl phosphate, monohexyl phosphate, dihexyl phosphate, monooleyl phosphate, sesquidodecyl polyoxyethylene (3) phosphate, sesquidodecyl polyoxyethylene (9) phosphate, sesquinonylphenyl polyoxyethylene (10) phosphate, monododecyl polyoxyethylene (5) phosphate, monooctadecyl polyoxyethylene (5) phosphate, sesquioctadecyl polyoxyethylene (5) phosphate, sesquioctylphenyl polyoxyethylene (10) phosphate, dioctyl polyoxyethylene (6) phosphate, sesquidodecyl polyoxypropylene (9) phosphate, monooctyl polyoxyethylene (12) phosphate, e. monooctadecenyl polyoxypropylene (8) phosphate, $[C_{11}H_{23}COO(CH_2CH_2O)_{10}]_{1.5}PO(OH)_{1.5}$, $C_{17}H_{35}COO(CH_2CH_2O)_3PO(OH)_2$, $C_{17}H_{35}COO(CH_2CH_2O)_{15}PO(OH)_2$, and $[C_5H_{11}COO(CH_2CH_2O)_2]_2PO(OH)$.

The alkenyl or alkyl succinic acid represented by the formula (II) above or a salt thereof or an anhydride thereof should have a linear or branched alkenyl or alkyl group represented by $R_2$. The one having a $C_{6-18}$ alkenyl group is preferable. In the case of a salt, the preferred counter ion is an alkali metal (such as $Na^+$ and $K^+$), an alkaline earth metal (such as $Mg^{2+}$), $NH_4$, morpholine, monoethanolamine, diethnaolamine, and triethanolamine. The salt does not necessarily need to be a completely neutralized one, but may be a partly neutralized one.

According to the present invention, the organosilane compound having hydrolyzable alkoxysilanes in one molecule is not specifically limited so long as it has hydrolyzable alkoxysilanes in one molecule. It may or may not have a functional group. Examples of the organosilane compound are shown below:

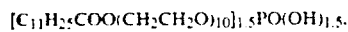

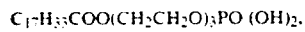

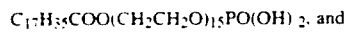

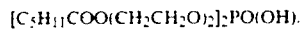

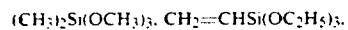

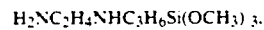

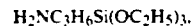

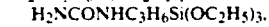

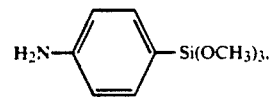

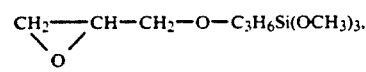

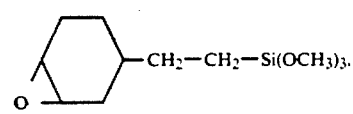

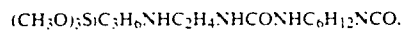

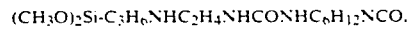

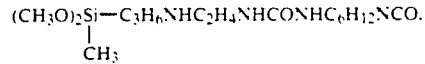

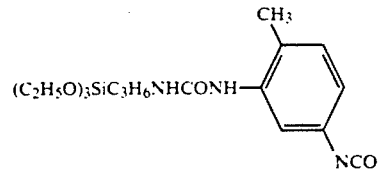

and a reaction product of 1 mol of a phenyl or alkyl-, trialkoxysilane and 1-2 mol of a long-chain fatty acid.

The fatty acid ester used in the present invention should preferably be an ester of a $C_{8-22}$ monobasic fatty acid and an alcohol. It may be any of saturated esters, unsaturated esters, branched esters, or linear esters. The fatty acid used in the present invention should preferably be a $C_{12-22}$ monobasic fatty acid.

According to the present invention, the fatty acid ester and the fatty acid should be use din a ratio of 60/40 to 95/5 (by weight), preferably 65/35 to 75/25. In addition, the total amount of the fatty acid ester and fatty acid should be 5-15 parts by weight, preferably 7-12 parts by weight, for 100 parts by weight of magnetic powder.

The carbon black used in the present invention should be one which has an average single particle diameter of 0.1-2.0 µm, preferably 0.4-1.5 µm, which is measured with an electron microscope. The carbon black should be used in an amount of 5-15 parts by weight, preferably 6-10 parts by weight, for 100 parts by weight of magnetic powder.

The binder used in the present invention includes, for example, polyurethane, polyester, polyvinyl chloride, vinyl chloride-vinyl acetate copolymer, polyacrylonitrile, nitrile rubber, epoxy resin, alkyd resin, polyamide, polyacrylate ester, polymethacrylate ester, polyvinyl acetate, polyvinyl butyral, polyvinylidene chloride, vinylidene chloride copolymer, nitrocellulose, maleic acid-modified vinyl chloride-vinyl acetate copolymer, and ethyl cellulose. Usually they are used in combination with one another, although they may be used alone. The binder may be incorporated with a plasticizer or hardener to adjust its hardness.

The binder should be used in an amount of 15-60 parts by weight per 100 parts by weight of magnetic powder, with an amount less than 15 parts by weight, the magnetic layer has a low strength and is poor in adhesion to the support, even if the binder has a good adhesion strength. More than 60 parts by weight of the binder and the less amount of the magnetic power in the magnetic layer will result in a decreased reproduction power and a deteriorated coating layer.

The magnetic layer of the magnetic recording medium of the present invention may be incorporated with commonly used additives (such as anti-friction material and antistatic agent) in addition to the above-mentioned components.

The nonmagnetic support for the magnetic recording medium of the present invention is made of polyester (such as polyethylene terephthalate), polyolefin (such as polyethylene and polypropylene), cellulose derivatives (such as cellulose triacetate and cellulose diacetate), polycarbonate, polyvinyl chloride, polyimide, and aromatic polyamide. It may also be made of metal (such as Al and Cu) and paper. It may be in the form of film, tape, sheet, disk, card, or drum. The surface of the support may be treated with corona discharge, radiation, or ultraviolet rays, or precoated with a resin.

The magnetic recording medium of the present invention has a low coefficient of dynamic friction even at low temperatures which does not substantially change with time even when the environment changes to high temperatures. Therefore, it has good durability.

EXAMPLES

The invention will be describe din more detail with reference to the following examples, which are not intended to restrict the scope of the invention. In Example, "parts" means parts by weight, unless otherwise indicated.

| Example 1 | |
|---|---|
| Surface-treated magnetic powder*[1] | 105 parts |
| Vinyl chloride-vinyl acetate copolymer*[2] | 10 parts |
| Polyurethane resin*[3] | 10 parts |
| Alumina (ave. particle dia. 0.6 μm) | 10 parts |
| Isocetyl stearate/palmitic acid = 75/25 | 10 parts |
| Carbon black (having an average single particle diameter of 0.35 μm) | 8 parts |
| Toluene | 70 parts |
| Methyl ethyl ketone | 70 parts |
| Cyclohexanone | 110 parts |

Remarks
*[1]Composed of 100 parts of Co-γ-Fe$_2$O$_3$ having a specific surface area of 20 m$^2$/g, 6 parts of sesquidodecyl polyoxyethylene (8 mol) phosphate, and 3 parts of H$_2$N—(CH$_2$)$_3$—Si(OC$_2$H$_5$)$_3$
*[2]Available under a trade name of "VAGH" from Union Carbide Corporation
*[3]Available under a trade name of "N-2301" from Nippon Polyurethane Industries Co., Ltd.

The above-listed components were mixed for 10 hours using a sand mill, followed by filtration. The resulting mixture (paint) was incorporated with 4.4 parts of hardening agent just before application.

This paint was applied to a support of 75-μm thick polyethylene terephthalate film using an applicator. The coating weight was adjusted so that the coating thickness was 1.5 μm after drying. After drying, the coated film underwent calendering and then punched into a disk. Thus there was obtained a magnetic disk.

The coefficient of dynamic friction of this magnetic disk was measured in an environment which was cyclically changed in temperature and relative humidity as follows: changed in temperature and relative humidity as follows:

(1) sustained at 60° C. and 25% RH for 0.5 hour,
(2) changed to 60° C. and 80% RH over 0.5 hour,
(9) sustained at 60° C. and 80% RH for over 2 hours,
(b 4) change to 60° C. and 25% RH over 0.5 hour.

The magnetic disk was also examined for change with time in the coefficient of dynamic friction at a low temperature (5° C. and 50% RH). The results are shown in Table 1.

| Example 2 | |
|---|---|
| Surface-treated metal powder*[1] | 105 parts |
| Vinyl chloride-vinyl acetate copolymer | 10 parts |
| Polyurethane resin | 15 parts |
| Alumina (ave. particle dia. 0.6 μm) | 10 parts |
| Butyl palmitate/oleic acid = 80/20 | 10 parts |
| Carbon black (having an average single particle diameter of 0.15 μm) | 7 parts |

-continued

| Example 2 | |
|---|---|
| Toluene | 70 parts |
| Methyl ethyl ketone | 70 parts |
| Cyclohexanone | 110 parts |

Remarks
*[1]Having a specific surface area of 50 m$^2$/g, surface-treated with 5 parts of alkenyl (C$_{16}$-C$_{18}$ mixture) succinic anhydride and 5 parts of
(CH$_3$)$_3$Si—(CH$_2$)$_3$—O—CH$_2$—CH——CH$_2$
\\ /
O A magnetic disk was prepared from the above-listed components in the same manner as in Example 1 and the coefficient of dynamic friction of the magnetic disk was measured in the same manner as in Example 1. The results are shown in Table 1.

| Example 3 | |
|---|---|
| Surface-treated magnetic powder*[1] | 105 parts |
| Vinyl chloride-vinyl acetate copolymer | 10 parts |
| Polyurethane resin | 15 parts |
| Cr$_2$O$_3$ | 8 parts |
| Oleyl oleate/stearic acid = 90/10 | 10 parts |
| Carbon black (having an average single particle diameter of 0.2 μm) | 8 parts |
| Toluene | 70 parts |
| Methyl ethyl ketone | 70 parts |
| Cyclohexanone | 110 parts |

Remarks
*[1]The same magnetic powder as used in Example 1, surface-treated with 5 parts of phenylpolyoxyethylene (10 mol) phosphate and 2 parts of (CH$_3$)$_3$(CH$_2$)$_3$—Si—(OC$_2$H$_5$)$_3$ A magnetic disk was prepared from the above-listed components in the same manner as in Example 1 and the coefficient of dynamic friction of the magnetic disk was measured in the same manner as in Example 1. The results are shown in Table 1.

| Example 4 | |
|---|---|
| Untreated γ-Fe$_2$O$_3$ (having a specific surface area of 15 m$^2$/g) | 105 parts |
| Vinyl chloride-vinyl acetate copolymer | 10 parts |
| Polyurethane resin | 15 parts |
| Alumina (ave. particle dia. 0.6 μm) | 10 parts |
| Tridecyl stearate/palmitic acid = 95/5 | 12 parts |
| Carbon black (having an average single particle diameter of 0.35 μm) | 10 parts |
| Toluene | 70 parts |
| Methyl ethyl ketone | 70 parts |
| Cyclohexanone | 110 parts |

A magnetic disk was prepared from the above-listed components in the same manner as in Example 1 and the coefficient of dynamic friction of the magnetic disk was measured in the same manner as in Example 1. The results are shown in Table 1.

| Comparative Example 1 | |
|---|---|
| Co-γ-Fe$_2$O$_3$ (having a specific surface area of 20 m$^2$/g) | 105 parts |
| Vinyl chloride-vinyl acetate copolymer | 10 parts |
| Polyurethane resin | 15 parts |
| Alumina (ave. particle dia. 0.6 μm) | 10 parts |
| Butoxyethyl stearate | 10 parts |
| Carbon black (having an average single particle diameter of 0.02 μm) | 8 parts |
| Toluene | 70 parts |
| Methyl ethyl ketone | 70 parts |
| Cyclohexanone | 110 parts |

A magnetic disk was prepared from the above-listed components in the same manner as in Example 1 and the coefficient of dynamic friction of the magnetic disk was measured in the same manner as in Example 1. The results are shown in Table 1.

| Comparative Example 2 | |
| --- | --- |
| Untreated γ-Fe₂O₃ (having a specific surface area of 15 m²/g) | 105 parts |
| Vinyl chloride-vinyl acetate copolymer | 10 parts |
| Polyurethane resin | 15 parts |
| Alumina (ave. particle dia. 0.6 μm) | 10 parts |
| Butoxyethyl stearate/palmitic acid = 70/30 | 8 parts |
| Toluene | 70 parts |
| Methyl ethyl ketone | 70 parts |
| Cyclohexanone | 110 parts |

A magnetic disk was prepared from the above-listed components in the same manner as in Example 1 and the coefficient of dynamic friction of the magnetic disk was measured in the same manner as in Example 1. The results are shown in Table 1.

TABLE 1

| Example No. | Coefficient of dynamic friction (60° C.) | | | Coefficient of dynamic friction (5° C.) | | |
| --- | --- | --- | --- | --- | --- | --- |
| | initial | 100 min later | 200 min later | initial | 100 min later | 200 min later |
| Example 1 | 0.14 | 0.14 | 0.14 | 0.15 | 0.16 | 0.16 |
| Example 2 | 0.16 | 0.16 | 0.16 | 0.16 | 0.17 | 0.17 |
| Example 3 | 0.15 | 0.15 | 0.15 | 0.16 | 0.17 | 0.17 |
| Example 4 | 0.18 | 0.18 | 0.18 | 0.16 | 0.17 | 0.18 |
| Comparative Example 1 | 0.19 | 0.30 | 0.26 | 0.18 | 0.20 | 0.27 |
| Comparative Example 2 | 0.26 | 0.49 | 0.35 | 0.25 | 0.30 | 0.39 |

What is claimed is:

1. A magnetic recording medium, which comprises a non-magnetic substrate and a magnetic recording layer provided on said substrate, comprising (a) 100 parts by weight of magnetic powder; (b) 5 to 15 parts by weight of a mixture of a fatty acid ester and a fatty acid in the weight ratio of 60/40 to 95/5 and, as the sole carbon black constituent, (c) 5 to 15 parts by weight of a carbon black having an average diameter of a single particle in the range of 0.1 to 2.0 microns.

2. The medium as claimed in claim 1, in which said recording layer further comprises 15 to 60 parts by weight of a binder.

3. The medium as claimed in claim 1, wherein said magnetic powder has been treated on the surface with:
 (1) a phosphate having the formula $[R_1O(AO)_n] \cdot PO(OH)_{3-l}$ (I), wherein $R_1$ is a hydrocarbon group or acryl group having 2-28 carbon atoms, A is an alkylene group having 2-4 carbon atoms, n is an integer of 1-30, and l is 1, 1.5 or 2, an alkenyl or alkyl succinic acid having the formula

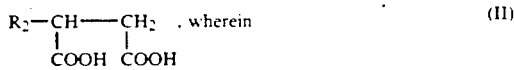

$$R_2-\underset{COOH}{CH}-\underset{COOH}{CH_2}, \text{ wherein} \quad (II)$$

$R_2$ is an alkenyl or alkyl group having 4-20 carbon atoms, a salt thereof, or an anhydride thereof; and
 (2) an organosilane compound having a hydrolyzable alkoxysilane group in a molecule.

4. The medium as claimed in claim 3, in which the weight ratio of said phosphate having the formula I or said alkenyl or alkyl succinic acid having the formula II to said organosilane compound ranges from 10:1 to 10:10.

5. The medium as claimed in claim 3, in which the sum total of said phosphate having the formula I or said alkenyl or alkyl succinic acid having the formula II and said organosilane compound amounts to 0.1 to 15 parts by weight.

6. The medium as claimed in claim 3, in which said magnetic powder is treated with said phosphate having the formula I or said alkenyl or alkyl succinic acid having the formula II and said organosilane compound by introducing said magnetic powder, said phosphate having the formula I or said alkenyl or alkyl succinic acid having the formula II, and said organosilane compound into an organic solvent which is inert to said magnetic powder, said phosphate or said alkenyl or alkyl succinic acid, and said organosilane compound, and agitating the resulting dispersion.

* * * * *